US007008114B2

(12) United States Patent
Derscheid et al.

(10) Patent No.: US 7,008,114 B2
(45) Date of Patent: Mar. 7, 2006

(54) BEARING FAILURE INDICATOR

(75) Inventors: Daniel Eric Derscheid, Ottumwa, IA (US); Henry Dennis Anstey, Ottumwa, IA (US)

(73) Assignee: Deere & Company, Moline, IL (US)

( * ) Notice: Subject to any disclaimer, the term of this patent is extended or adjusted under 35 U.S.C. 154(b) by 158 days.

(21) Appl. No.: 10/641,148

(22) Filed: Aug. 14, 2003

(65) Prior Publication Data

US 2005/0036724 A1 Feb. 17, 2005

(51) Int. Cl.
*F16C 19/52* (2006.01)

(52) U.S. Cl. ....................................... 384/448; 384/624

(58) Field of Classification Search .................. 384/91, 384/102, 126, 127, 448, 624; 340/682
See application file for complete search history.

(56) References Cited

U.S. PATENT DOCUMENTS

| | | | | |
|---|---|---|---|---|
| 3,183,043 | A * | 5/1965 | Creeger et al. | 384/624 |
| 3,897,116 | A | 7/1975 | Carpenter | |
| 4,063,786 | A * | 12/1977 | Rall | 384/624 |
| 5,224,835 | A | 7/1993 | Oltman | 417/12 |
| 5,806,988 | A * | 9/1998 | Dublin et al. | 384/128 |
| 5,998,894 | A * | 12/1999 | Raad | 340/682 |
| 6,237,877 | B1 | 5/2001 | Wallace et al. | 246/169 A |
| 6,271,761 | B1 | 8/2001 | Smith et al. | 340/682 |
| 6,314,788 | B1 | 11/2001 | Williams, Sr. | 73/7 |

FOREIGN PATENT DOCUMENTS

| | | |
|---|---|---|
| DE | 336 660 | 5/1921 |
| DE | 202 02 536 | 5/2002 |

OTHER PUBLICATIONS

Patent Abstracts Of Japan Bd. 0182, Nr. 27 (M-1597), Apr. 25, 1994, & JP 06 017827, Koyo Seiko Co. Ltd, Jan. 25, 1994.

Patent Abstracts Of Japan Bd. 0111, Nr. 60 (M-592), May 23, 1987, & JP 61 294215, Asahi Chem Ind Co Ltd, Dec. 25, 1986.

* cited by examiner

*Primary Examiner*—Thomas R. Hannon

(57) ABSTRACT

A shaft is disposed along an axis of rotation and a bearing failure indicator, in the form of a disk having protrusions or teeth spaced about its periphery, is provided on the shaft adjacent a bearing supporting a tubular roll for rotation relative to the shaft. When the bearing has undergone a predetermined amount of wear, which happens prior to bearing failure, the teeth or protrusions of the disk come into engagement with a contact surface due to non-concentric rotation of the roll relative to the shaft. In one embodiment, the disk is thick and the teeth make an audible knocking sound which warns an operator of an impending bearing failure. In another embodiment, the disk is relatively thin and a squealing sound is generated when the protrusions engage the contact surface. In addition to the bearing failure indicator, a slip coupling may be used to prevent the transmission of torque to the drive shaft when interference between the disk and the contact surface occurs. Further, a secondary bearing may be provided to prolong operation of a wearing primary bearing.

6 Claims, 2 Drawing Sheets

BEARING FAILURE INDICATOR

FIELD OF THE INVENTION

The present invention relates to a bearing failure indicator, and more particularly relates to a failure indicator which will apprise an operator that a bearing failure is imminent and that the bearing needs to be replaced so as to avoid possible damage to secondary parts.

BACKGROUND OF THE INVENTION

It is known to use a sensor to detect when a bearing-supported shaft begins non-concentric rotation, due to bearing wear, and comes into contact with a surface, and to generate an electrical signal corresponding to the sensed contact. An example of such a sensing arrangement is disclosed in U.S. Pat. No. 5,224,835. Other patents which describe bearing wear or failure sensing arrangements are: U.S. Pat. Nos. 6,314,788; 6,271,761; and 6,237,877.

The prior art bearing wear sensing arrangements have one or more of the drawbacks of being relatively complicated or expensive.

SUMMARY OF THE INVENTION

According to the present invention, there is provided an improved bearing wear indicator of the type which senses non-concentricity of the bearing-supported element.

An object of the invention is to provide a simple, inexpensive bearing wear indicator.

The above object is achieved, in accordance with one embodiment, wherein the bearing-supported element is driven by a drive containing a slip clutch, by providing respective abutment surfaces on a component rotating together with a bearing-supported shaft, or the like, and an adjacent fixed component, whereby contact between the respective abutment surfaces due to non-concentricity will result in the slip clutch slipping so as to warn the operator of an imminent bearing failure.

The above object is achieved, in accordance with a second embodiment, wherein a thin metal disc is provided adjacent the bearing assembly such that protrusions about the periphery of the disc come into contact with the surface of an adjacent member when the bearing-supported component begins non-concentric rotation due to bearing wear, the contact resulting in an audible sound such as a squeal or knock.

Yet another object of the invention is to provide a secondary bearing which will support the bearing-supported component so as to provide a low friction support after primary bearing failure, and prolong the time for action to be taken after the alert given by the bearing wear detector.

This and other objects of the invention will become apparent from a reading of the ensuing description together with the appended drawings.

DESCRIPTION OF THE PREFERRED EMBODIMENT

Figure 1:
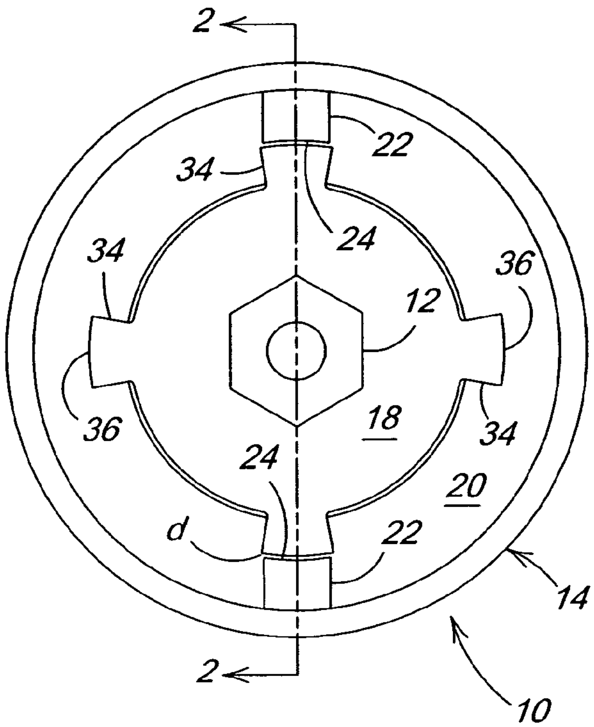
FIG. 1 is an end view of a cylindrical roller and hexagonal shaft assembly embodying a first embodiment of the invention.
Figure 2:
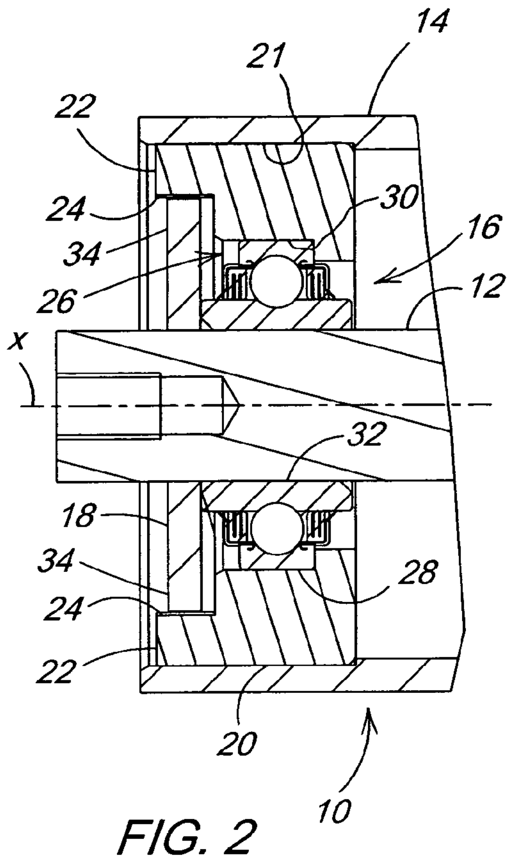
FIG. 2 is a sectional view taken along line 2—2 of FIG. 1.

Referring now to FIGS. 1 and 2, there is shown a roller and shaft assembly 10 including a shaft 12 extending along a rotation axis X, a cylindrical tube 14, disposed concentrically about the shaft 12, a bearing assembly 16 supporting the cylindrical tube 14 on the shaft 12, and a toothed disc 18 mounted on the shaft 12 adjacent the bearing assembly 16.

The shaft 12 is hexagonal and would be fixed so as to prevent its rotation about the axis X. An example of such an installation is the idler rolls of a large round baler where the ends of the shaft are anchored to the opposite side walls of the baling chamber, with the cylindrical tube being engaged and driven by the bale-forming belts. However, the invention would also apply to situations where the bearing assembly 16 is used to mount the shaft 12 to a fixed body for rotation. An example of this type of installation is a bale-forming belt drive roll of a large round baler where the shaft is driven and supported to the opposite side walls of the baling chamber by a bearing assembly.

The bearing assembly 16 includes a cylindrical bearing housing 20 located within each end of (only one end shown), and fixed to an interior wall surface 21 of, the tube 14. Joined to an axially outer face of the bearing housing 20 are a pair of diametrically opposite, axially projecting contact lugs 22. Each lug 22 has an arcuate inner contact surface 24 formed concentrically about the rotation axis X.

The bearing assembly 16 further includes a roller bearing 26 having an outer race 28 pressed into a stepped bore 30 of the bearing housing 20 and an inner race 32 having a central opening shaped complementary to and received on the hexagonal cross section shaft 12 so that the inner race 32 is fixed from rotating.

The toothed disc 18 is mounted on the shaft 12 adjacent the roller bearing 26 and in radial alignment with the contact lugs 22. The disc 18 is provided with four equi-angularly spaced teeth 34, each having a radially outer surface 36 formed concentrically about the axis X at a radius which places the surface 36 at a predetermined clearance d from the contact surface 24 of a given lug 22 when the tooth and lug are radially adjacent each other and the bearing 26 is in an unworn condition.

During operation, wear of the rolling elements and the respective mating surfaces of the outer and inner races 28 and 32 of the bearing 26 cause the rotation of the tube 14 to become non-concentric about the axis X. At a predetermined amount of wear, the surfaces 24 and 36 will contact each other and cause a ticking or knocking sound, which will warn the operator of an impending bearing failure.

Figure 3:
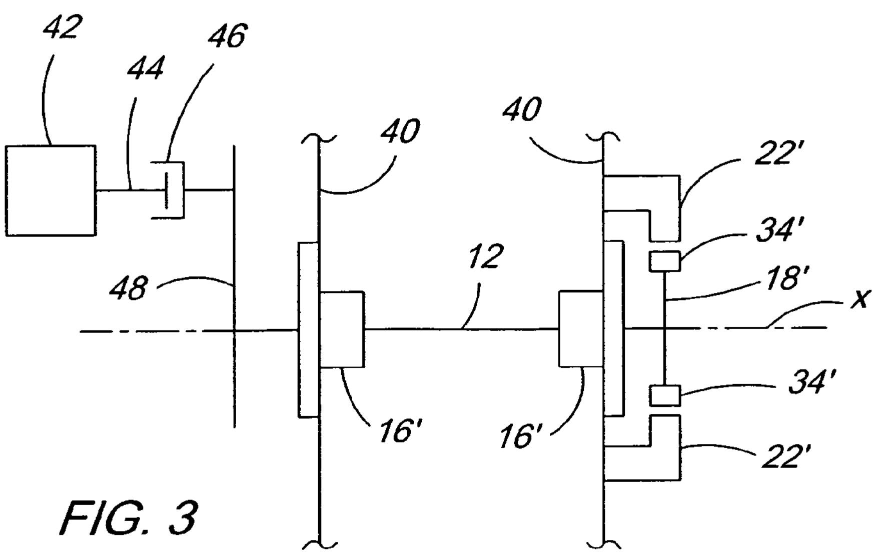
FIG. 3 is a schematic representation of a drive arrangement for the roller and shaft assembly shown in FIG. 2.

Referring now to FIG. 3, there is shown an installation where the shaft 12 is positioned along the rotation axis X and is supported for rotation in a pair of spaced bearing assemblies 16' that are fixed to respective side walls 40. A power source, shown schematically at 42, is coupled to a drive shaft 44 containing a slip coupling 46 and having a chain sprocket at one end (not visible) coupled, by a drive chain 48, to a chain sprocket (not visible) mounted on one end of the shaft 12. A toothed disc 18' is mounted to the shaft 12 adjacent one of the bearing assemblies 16' and includes contact teeth 34' arranged at a constant radius from the axis X. Fixed to the wall 40 and also located at a constant radius from the axis X are contact lugs 22'. As long as the bearings and associated structures of the bearing assemblies 16' are in a relatively unworn condition, there is a predetermined clearance gap between the contact teeth 34' and the contact lugs 22'. After a certain amount of bearing wear, the shaft 12 will rotate non-concentrically relative to the axis X by an amount greater than the gap between the contact teeth 34' and lugs 22', resulting in the contact teeth coming into contact with the contact lugs. When there is a relatively large loss in radial clearance between the teeth 34' and projections 22', the rotational torque resistance will increase to such an extent that the slip coupling 46 will slip so as to disconnect the shaft 12 from the power source 42. The operator will then know that he should replace the worn bearings.

Figure 4:
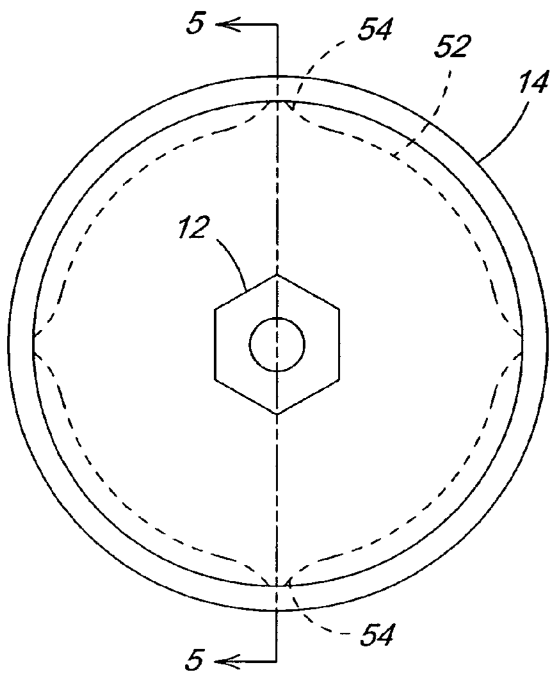
FIG. 4 is an end view of a cylindrical roller and hexagonal shaft assembly embodying a second embodiment of the invention.
Figure 5:
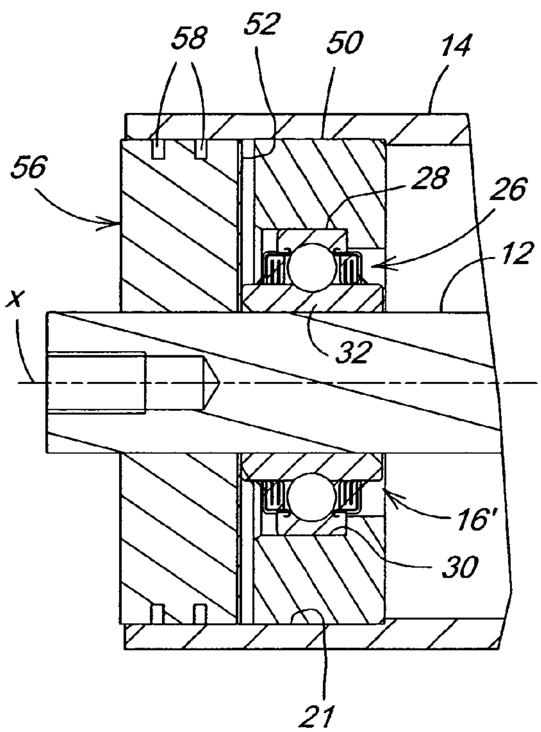
FIG. 5 is a sectional view taken along line 5—5 of FIG. 4.

Referring now to FIGS. 4 and 5, there is shown a second embodiment of the invention wherein components like those described above relative to the embodiment shown in FIGS. 1 and 2 are given the same reference numerals.

Thus, the fixed shaft 12 supports each end of the cylindrical tube 14 by a bearing assembly 16' that includes a cylindrical bearing housing 50 fixed within the tube end and receiving the roller bearing 26.

Mounted on the shaft 12 adjacent the bearing 26 is a relatively thin squeal disc or plate 52 having a plurality of protrusions 54 (see FIG. 4) disposed at equally spaced locations about the periphery of the disc 52. The radially outer ends of the protrusions 54 are normally spaced a preselected radial distance from the interior surface 21 of the cylindrical roll 14. When the bearings 26 become worn to the extent that the roller 14 rotates non-concentrically about the axis X, the protrusions 54 will contact the inner surface 21 of the roll 14 and cause a squealing noise to be generated so that the operator is alerted to the fact that the bearings need to be replaced.

The time between failure of the bearings 26 and when the protrusions 54 of the squeal disc 52 come into contact with the roll 14 may be prolonged by providing a secondary support bushing 56 for supporting the tube 14 for rotation about the shaft 12. Specifically, with reference to FIG. 5, it can be seen that the secondary support bushing 56 is located on the shaft 12 adjacent the squeal disc 52. The bushing 56 comprises a cylindrical member made of low friction plastic material having annular grooves 58 in its periphery at axially spaced locations. Thus, it will be appreciated that the bushing 56 will provide low-friction support for the cylindrical roll 14 when the bearing 26 begins to wear, and it will not be until the radial periphery of the bushing 56 wears sufficiently to permit the protrusions 54 of the squeal disc 52 to contact the interior surface of the roll 14 that the operator will be required to replace the bearings 26. At this time, the bushings 56 will also be replaced.

Having described the preferred embodiment, it will become apparent that various modifications can be made without departing from the scope of the invention as defined in the accompanying claims.

What is claimed is:

1. In combination with a shaft located along an axis of rotation, a first member disposed in concentric relationship to said shaft and a pair of bearings mounted on the shaft, and each bearing including an inner race engaging and being secured to the shaft and an outer race engaging and being secured to said first member, a bearing failure indicator, comprising: a contact surface disposed at a fixed radius relative to said axis of rotation; a second member mounted on said shaft and having at least one projection disposed at a predetermined clearance distance from said contact surface when said bearing is unworn, whereby, when said bearing undergoes a predetermined amount of wear one of said shaft and first member will rotate non-concentrically relative to said axis such that said projection will come into contact with said contact surface and thereby generate an audible sound which alerts an operator of an impending bearing failure, and wherein said shaft is mounted for rotation about said axis; a drive being coupled to said shaft and including a power source, and a slip coupling located between a power source and said shaft; said slip coupling normally establishing a drive connection between said power source and said shaft but being responsive to an increase in torque caused by said at least one projection engaging said contact surface so as to slip and disconnect the transfer of torque to said shaft, thereby requiring an operator to replace the bearings so as to avoid a bearing failure.

2. The combination, as defined in claim 1, wherein said at least one projection is a tooth having an arcuate surface facing radially outwardly from said axis; and said contact surface being arcuate and facing radially inwardly toward said axis; and said clearance gap being established between said arcuate surface facing radially outwardly and said contact surface facing radially inwardly when said tooth and contact surface are in radial alignment with each other.

3. The combination, as defined in claim 1 wherein said first member is a bearing housing having at least one lug joined to an axially facing surface thereof; said at least one lug having a radially inwardly facing surface defining said contact surface; said second member being a disk; and said projection being a radially outwardly extending tooth formed on said disk and defining a second contact surface disposed for establishing said clearance gap when passing adjacent said contact surface of said at least one lug.

4. The combination, as defined in claim 1, wherein said second member is a disk; said at least one projection being a protrusion extending radially from a periphery of said disk; and said contact surface being disposed arcuately about said axis in radial alignment with said at least one protrusion.

5. The combination, as defined in claim 1, wherein said first member includes a cylindrical tube having an interior surface defining said contact surface; and a secondary bearing being defined by a cylindrical plastic member and being mounted on said shaft, with an outer periphery of said plastic member being in sliding engagement with said contact surface; whereby a radial amount of material of said secondary bearing equal to said radial gap will have to wear away before said protrusion will be able to come into contact with said contact surface, thus prolonging the amount of time that an operator can wait before replacing a worn bearing.

6. The combination, as defined in claim 1, wherein said shaft is fixed; a cylindrical tube being arranged in concentric relationship to said axis when said bearings are unworn; said first member being a bearing housing fixed within said cylindrical tube; and said bearing housing having at least one lug fixed to an axially facing surface thereof and defining said contact surface.

* * * * *